United States Patent
Jeschke et al.

(10) Patent No.: US 7,037,442 B2
(45) Date of Patent: May 2, 2006

(54) DEICING COMPOSITION AND ANTIICING COMPOSITION, THICKENED WITH SHEET SILICATES

(75) Inventors: Ingo Jeschke, Burgkirchen (DE); Achim Stankowiak, Altoetting (DE); Mirjana Golub, Burgkirchen (DE); Sabine Frauenhuber, Schalchen (AT)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 11/030,780

(22) Filed: Jan. 7, 2005

(65) Prior Publication Data

US 2006/0054857 A1 Mar. 16, 2006

(30) Foreign Application Priority Data

Jan. 9, 2004 (DE) .................. 10 2004 001 409

(51) Int. Cl.
*C09K 3/18* (2006.01)
*B64D 15/06* (2006.01)
*B64D 15/00* (2006.01)

(52) U.S. Cl. ..................... 252/70; 106/13; 427/331

(58) Field of Classification Search .............. 252/70; 106/13; 427/331
See application file for complete search history.

(56) References Cited

U.S. PATENT DOCUMENTS

| 4,954,279 | A | | 9/1990 | Ma et al. |
| 5,118,435 | A | | 6/1992 | Nieh |
| 5,273,673 | A | | 12/1993 | Ashrawi et al. |
| 5,334,323 | A | | 8/1994 | Schrimpf et al. |
| 5,385,688 | A | * | 1/1995 | Miller et al. .............. 252/73 |
| 5,386,968 | A | | 2/1995 | Coffey et al. |
| 5,750,047 | A | | 5/1998 | Lemma |
| 5,772,912 | A | | 6/1998 | Lockyer et al. |
| 5,817,252 | A | | 10/1998 | Hu et al. |
| 5,935,488 | A | | 8/1999 | Wiesenfeld et al. |
| 6,773,622 | B1 | * | 8/2004 | Andrews et al. .......... 252/70 |

FOREIGN PATENT DOCUMENTS

| CA | 2264882 | 3/1998 |
| EP | 0221269 B1 | 5/1987 |

OTHER PUBLICATIONS

Abstract of EP 0221269 B1 (May 13, 1987).

* cited by examiner

*Primary Examiner*—Anthony J. Green
(74) *Attorney, Agent, or Firm*—Richard P. Silverman

(57) ABSTRACT

The invention provides a deicing or antiicing composition, containing from 35 to 93% by weight of at least one glycol and from 0.01 to 15% by weight of at least one water-soluble sheet silicate, and water ad 100% by weight, based on the weight of the deicing composition.

10 Claims, No Drawings

DEICING COMPOSITION AND ANTIICING COMPOSITION, THICKENED WITH SHEET SILICATES

The present invention relates to water/glycol mixtures which have been thickened with sheet silicates and can be used as deicing compositions and antiicing compositions. These mixtures serve to remove frozen precipitation such as ice and snow from surfaces, and also to prevent reicing of the surfaces.

Deicing compositions and antiicing compositions have particular significance for the treatment of aircraft surfaces. During takeoff of the aircraft, these fluids are intended to flow off the aircraft surfaces as a result of the shear stresses which occur at takeoff. For the sake of simplicity, all of these fluids will be referred to hereinbelow as aircraft deicing compositions or deicing compositions.

During the winter months, aircraft surfaces can be covered by frozen precipitation. This frozen precipitation has to be removed before the aircraft takes off, since it otherwise leads to severe impairment of the lift which is required for the takeoff.

A distinction is drawn between deicing compositions which are used predominantly to remove frozen precipitation, and antiicing compositions which are intended to counteract reicing of aircraft surfaces which have already been deiced and thus cleaned.

In general, frozen precipitation is removed by using deicing compositions based on water/glycol. The glycol serves as a freezing point-reducing medium. In addition, surfactants are present which lower the surface tension of the deicing composition and thus improve the wetting of the aircraft surfaces. Deicing compositions may also comprise corrosion inhibitors, defoamers, dyes and flame retardants. Such unthickened deicing compositions feature Newtonian rheology. This means that their viscosity is independent of shear. In accordance with the SAE (Society of Automotive Engineering) convention, nonthickened deicing compositions having Newtonian rheology are referred to as type I fluids. Depending on the external temperature, type I fluids are diluted with a different amount of water and applied hot to the aircraft surfaces using sprayer vehicles. They allow frozen deposits to be removed effectively. However, type I fluids only have very limited protection from reicing.

In contrast to pure deicing compositions, antiicing compositions additionally comprise thickener substances. The viscosity, caused thereby, of these fluids improves the protection from reicing, since the fluid in the state of rest only flows very slowly off the aircraft surfaces and can thus absorb frozen precipitation over a prolonged period. The thickeners used provide antiicing compositions with non-Newtonian, pseudoplastic rheology. The viscosity of these fluids is shear-dependent. At the moment at which the aircraft takes off, the viscosity of the fluid falls very markedly as a result of the increasing air resistance and can thus flow rapidly off the aircraft surfaces. Depending on the icing protection time, a distinction is drawn between type II and type IV fluids. Type III fluids feature particularly pseudoplastic rheology, so that they serve to deice aircraft having a low takeoff speed.

Aircraft deicing compositions have to satisfy a large number of requirements. According to the SAE specifications AMS (Aerospace Material Standards) 1424 and AMS 1428, not only the runoff performance and the icing protection time are investigated, but also many further physical properties.

These include, for example, the storage stability of aircraft deicing compositions. The viscosity of the aircraft deicing compositions must not change during storage over a prolonged period. A good aircraft deicing composition must not be corrosive, and in particular not toward aluminum, magnesium, steel and acrylic glass. It must be environmentally compatible and not support fire.

In addition, thickened aircraft deicing compositions have to be shear-stable. The fluids are applied using sprayer vehicles which cause a high mechanical stress on the fluid. In the course of this, the deicing compositions must not lose more than 20% of their original viscosity. Finally, residues of aircraft deicing compositions which have accumulated in aerodynamically quiet zones of the wings after takeoff and have thus not been able to flow off must not form any gel deposits. In the case of the latter two properties, there is a need for further development.

U.S. Pat. No. 4,954,279 describes the microemulsion of an oil in a water/glycol mixture. In addition, thickeners and surfactants are present. Since all components are present in a microemulsion, important fluid properties such as storage stability, in particular at low temperatures, are improved.

U.S. Pat. No. 5,118,435 discloses a deicing composition based on the synergistic action which is achieved by the combination of two polyacrylates as a thickener. The viscosity of the fluid is temperature-independent, so that the film thickness of the deicing composition employed is very low at any possible temperature, and the fluid thus always flows off efficiently when the aircraft takes off.

U.S. Pat. No. 5,273,673 discloses deicing compositions which have distinctly improved holdover times as a result of a content of alkylphenol ethoxylates.

U.S. Pat. No. 5,386,968 discloses that the same surfactant class is suitable for an improvement in the holdover time of diluted unthickened aircraft deicing compositions.

U.S. Pat. No. 5,334,323 discloses that the neutralization of the polyacrylic acid serving as a thickener can be carried out using a mixture of NaOH and KOH. As a result, the aircraft deicing composition has particularly low viscosity and flows off effectively.

U.S. Pat. No. 5,750,047 discloses that the icing protection time of thickened deicing compositions can be considerably increased by polyacrylates.

U.S. Pat. No. 5,772,912 discloses environmentally friendly deicing compositions for highly differing applications which are based on xanthan as a thickener.

U.S. Pat. No. 5,817,252 discloses the combination of two nonionic surfactants having different HLB value, in order to control the diffusion of the frozen precipitation, so that the deicing composition remains effective for longer. According to U.S. Pat. No. 5,935,488, the same principle can be applied to SAE type II fluids.

From the prior art, it becomes clear that the development of aircraft deicing compositions has hitherto concentrated almost exclusively on an improvement in the holdover time and in the runoff performance.

Hitherto, thickened aircraft deicing compositions have been synthesized using exclusively thickeners on an organic basis. These are preferably crosslinked homo- or copolymers of unsaturated carboxylic acids such as acrylic acid, methacrylic acid and derivatives thereof such as esters and amides, and also cellulose ethers (alkyl-, hydroxyalkyl- and carboxyalkylcellulose ethers), polyethylene glycols, polyvinylpyrrolidones, polyvinyl alcohols, polyethylene oxides, xanthan gum and the like, or mixtures of such water-soluble polymers. The thickening mechanism of all these organic polymers is based on the formation of a polymer network in the glycol solution.

However, all thickeners mentioned here are more or less highly irreversibly damaged on mechanical stress. This is exhibited by an irreversible loss in viscosity on high shear stress as a result of high-speed stirrers, pumps or when flowing through small pipe cross sections. The mechanical stress brings about breakage of the polymer chains and associated irreversible damage to the polymer network.

It is therefore an object of the invention to design aircraft deicing compositions simultaneously in such a way that they lose very little viscosity on mechanical stress such as pumping or spraying using sprayer units.

In addition, all thickeners mentioned here tend to gel formation under certain external conditions. When aircraft deicing compositions accumulate after takeoff in aerodynamically quiet regions of the aircraft, they dry fully as a result of the low air pressure at flying heights from 5000 m. These residues may swell greatly if they come into contact with moisture such as rainwater. The resulting gels may freeze at low temperatures, as occur at high flying heights, and thus block the elevators, which results in the aircraft no longer being fully maneuverable.

All aircraft deicing compositions based on conventional thickeners form distinctly visible amounts of gel residues. Depending on the thickener type, these gels can be removed more or less readily in the course of rehydration with water. A desirable fluid residue would be one which could be rinsed off fully by water within the first immersion operations.

It is therefore also an object of the invention to formulate aircraft deicing compositions in such a way that dry fluid residues cannot form any gel residues with rainwater.

It has now been found that, surprisingly, antiicing compositions which, in addition to the generally customary, known constituents of antiicing compositions, for example glycols, surfactants, basic and acidic compounds for regulating the pH and corrosion protectants, simultaneously comprise sheet silicates as thickeners do not exhibit any loss in viscosity on mechanical stress. In addition, these antiicing compositions, after drying out, only form residues which dissolve fully in water after rehydration and thus do not form any sparingly soluble gels.

These thickeners are water-soluble sheet silicates which belong, for example, to the mineral family of the smectites, which include both naturally occurring and synthetically obtained hectorites and bentonites, and montmorillonites. These inorganic thickeners have the feature that they can include water and organic molecules such as glycols between the silicate layers, so that they can serve as thickeners for aqueous systems.

Aircraft deicing compositions based on these thickeners not only fulfill the requirement for a high viscosity at rest and flow limit with simultaneously very marked pseudo-plasticity, but are additionally extremely shear-stable on mechanical stress. In addition, dried-out residues of these aircraft deicing compositions can be fully dissolved with the aid of water and do not form any sparingly soluble gels. These sheet silicates can be used either alone or in combination with the abovementioned organic thickeners. It is noteworthy that the use concentrations of the abovementioned organic thickeners can be greatly reduced if they are used in combination with sheet silicates.

The present invention thus provides a deicing or antiicing composition, containing from 35 to 93% by weight of at least one glycol and from 0.01 to 15% by weight of at least one water-soluble sheet silicate, and water ad 100% by weight, based on the weight of the deicing composition.

The invention further provides the use of from 0.01 to 15% by weight of at least one water-soluble sheet silicate for thickening a composition which contains from 35 to 93% by weight of at least one glycol and water ad 100% by weight.

The invention further provides a process for thickening a deicing or antiicing composition, containing from 35 to 93% by weight of at least one glycol and water ad 100% by weight, by adding to it from 0.01 to 15% by weight of at least one water-soluble sheet silicate.

The inventive deicing and antiicing compositions are particularly suitable for the deicing of aircraft. However, they are also suitable for the deicing and the icing protection of other means of transport such as motor vehicles or trains, or for any surfaces which are to be protected from icing.

The inventive deicing and antiicing compositions (referred to herein below as "deicing compositions") may, in addition to glycol, water and water-soluble sheet silicates, comprise further constituents. Such further constituents are, for example, surfactants, corrosion inhibitors, basic compounds or acidic compounds for pH adjustment and further, organic thickeners. In a preferred embodiment, an inventive deicing composition may thus comprise the following constituents:

a) from 35 to 93% by weight, preferably from 45 to 90% by weight, of at least one glycol from the group of the alkylene glycols having from 2 to 3 carbon atoms and oxalkylene glycols having from 4 to 6 carbon atoms, b) from 0 to 10% by weight, preferably from 0.02 to 2% by weight, of at least one surfactant from the group of the nonionic or anionic surfactants, c) from 0.01 to 5% by weight, preferably from 0.02 to 2% by weight, of at least one corrosion inhibitor, d) from 0.02 to 15% by weight, preferably from 0.05 to 10% by weight, of a water-soluble sheet silicate, e) if appropriate, at least one basic compound from the group of the alkali metal carbonates, alkali metal hydroxides or amines to set the pH between 6 and 11, f) if appropriate, at least one acidic compound from the group of the inorganic or organic acids to set the pH between 6 and 11, g) if appropriate, additional organic thickeners from the group of the homo- or copolymers of an unsaturated carboxylic acids such as acrylic acid, methacrylic acid and derivatives thereof such as esters and amides, and also cellulose ethers (alkyl-, hydroxyalkyl- and carboxyalkylcellulose ethers), polyethylene glycols, polyvinylpyrrolidones, polyvinyl alcohols, polyethylene oxides, xanthan gum and h) water as the remainder to 100% by weight.

Percentages by weight are always based on the weight of the deicing composition.

Constituents b, c, e, f and g are not necessarily present in the inventive deicing composition. Preferred deicing compositions, in addition to constituents a, d and h, comprise one or more further constituents selected from b, c, e, f and g.

Component a) of the inventive deicing composition is preferably ethylene glycol, propylene glycol (1,2-propylene glycol or 1,3-propylene glycol), diethylene glycol, dipropylene glycol or a mixture of two or more of these glycols, of which propylene glycols are particularly preferred. The glycols serve in particular to reduce the freezing point and, in addition to water, constitute the main component of the deicing composition.

Component b) may preferably be a fatty alcohol having from 6 to 24 carbon atoms, preferably from 8 to 18 carbon atoms, in the alkyl radical, or an alkoxylate thereof having from 1 to 10, preferably from 1 to 8, alkoxy groups, especially of ethylene oxide, propylene oxide or a mixture thereof, of which ethylene oxide is preferred. Said alkyl radical in the fatty alcohol may be straight or branched, aliphatic or aromatic, saturated or unsaturated, having preferably from 1 to 3 double bonds. Examples include octyl, decyl, dodecyl, isotridecyl, para-isononylphenyl, para-isooctylphenyl and stearyl alcohol, and also oleyl, cocoalkyl and tallow alkyl alcohol. Component b) may also be a mixture of the fatty alcohols and/or fatty alcohol ethoxylates mentioned, for example a fatty alcohol mixture having a $C_{12}$-alkyl radical and $C_{14}$-alkyl radical ($C_{12}/C_{14}$ fatty alcohol).

Component b) may also preferably be a potassium and/or sodium alkylarylsulfonate having one or more, preferably one or two, sulfonate groups, one or more, preferably one or two, alkyl groups having from 5 to 18 carbon atoms, preferably from 12 to 18 carbon atoms, and one or more, preferably one or two, benzene rings.

Component c) comprises corrosion inhibitors, as are customary for deicing compositions based on glycols and water. Suitable corrosion inhibitors are alkali metal phosphates, lower alkyl phosphates such as ethyl phosphate, dimethyl phosphate, isopropyl phosphate and the like, imidazoles such as 1H-imidazole, methylimidazole, benzimidazole and the like, and triazoles such as benzotriazole and tolyltriazole. It is also possible to use thiourea, sodium nitrate or butyne-1,4-diol.

Used as component d) are naturally occurring or synthetically obtained water-soluble sheet silicates. These may belong, for example, to the mineral family of the smectites, which include both naturally occurring and synthetically obtained hectorites and bentonites, or montmorillonites. Natural sheet silicates have, for example, the formula $(Al_{(2-y)}Mg_y)[Si_{(4-x)}Al_xO_{20}(OH)_2]_{(x+y)}^-$ where x and y may each assume different values, $Al^{3+}$ may be substituted by $Mg^{2+}$ and $Fe^{3+}$, and also $Si^{4+}$ by $Al^{3+}$, and further cations such as $K^+$, $Li^+$, $Ca^{2+}$ and $Mg^{2+}$ or else further anions such as $F^-$ or $OH^-$ may be included in the crystal structure.

Synthetically obtained sheet silicates have, for example, the formula $[Si_8(Mg_aLi_bH_c)O_{20}(OH)_{(4-y)}F_y]_z^-$ where a, b, c, y and z may each assume different values, $Mg^{2+}$ may be substituted by $Al^{3+}$ and $Fe^{3+}$, and also $Si^{4+}$ by $Al^{3+}$, and further cations such as $K^+$, $Li^+$, $Ca^{2+}$ and $Mg^{2+}$ or else further anions such as $F^-$ or $OH^-$ may be included in the crystal structure.

Component e) is preferably a basic pH regulator from the group of the alkali metal hydroxides such as NaOH and KOH, the alkylamines such as butylamine, hexylamine, octylamine and isononylamine, and the alkanolamines such as mono-, di- and triethanolamine. Particular preference is given to the alkali metal hydroxides. When the inventive deicing composition comprises such a basic compound, its content is preferably from 0.1 to 5% by weight, based on the weight of the deicing composition.

Component f) is preferably an acidic pH regulator from the group of the inorganic or organic acids, such as phosphoric acid, phosphorous acid, mono- and dicarboxylic acids having alkyl groups having from 2 to 12 carbon atoms, preferably from 4 to 8 carbon atoms, and one or more, preferably one or two, benzene rings. When the inventive deicing composition comprises such an acidic pH regulator, its content is preferably from 0.1 to 5% by weight, based on the weight of the deicing composition.

Component g) is a water-soluble thickener. Preference is given to using crosslinked homo- or copolymers of unsaturated carboxylic acids such as acrylic acid, methacrylic acid and derivatives thereof such as esters and amides, and also cellulose ethers (alkyl-, hydroxyalkyl- and carboxyalkylcellulose ethers), polyethylene glycol, polyvinylpyrrolidones, polyvinyl alcohols, polyethylene oxides, xanthan gum and the like, or mixtures of such water-soluble polymers. When the inventive deicing composition comprises such a thickener, its content is preferably from 0.1 to 5% by weight, based on the weight of the deicing composition.

The inventive deicing compositions contain generally at least 5%, preferably at least 10% by weight of water.

In addition, the deicing compositions may comprise defoamers, dyes, complexing agents and antioxidants.

The inventive deicing composition is prepared by mixing the individual components together in any sequence, which may be undertaken for example, in a vessel equipped with a stirrer.

The invention will now be illustrated by examples:

After mechanical stress, the deicing composition should not have any significant irreversible viscosity loss. The viscosity loss is examined in the laboratory using a Brookfield counter-rotating mixer which consists of two shear blades which rotate in opposite directions. The shear blades move at a rotation rate of 3500 revolutions per minute. When the counter-rotating mixer is immersed into an aircraft deicing composition, the thickener molecules are compressed through the narrow gap between the two shear blades, which can damage them irreversibly depending on the thickener type. The viscosity loss which occurs leads to a lowering of the holdover time.

The fully dried deicing composition should not form any residues which swell by rehydration to give sparingly soluble gels. To examine the gel formation, aluminum sheets of 2024-T3 material having a surface area of 100 mm×50 mm×1 mm were used. The surface of the sheets is aged by alternating short immersion in each of sodium hydroxide solution and nitric acid, so that the fluid and gel residues can adhere better. The aluminum sheet is immersed fully into the fluid to be examined for four seconds and subsequently dried at a temperature between 30° C. and 35° C. After 24 hours, this step is repeated in each case six times with the same sheet. Within this first test phase, a dry residue is gradually formed on the aluminum surface.

In the second test section, the sheet with the dried fluid residue is immersed into demineralized water for 30 seconds and pulled carefully back out of the water. After 60 seconds, the weight of the sheet with the swollen fluid residue is weighed. This rehydration step is repeated a total of ten times. Subsequently, the profile of the change in weight can be used to assess the gelling tendency of the fluid.

EXAMPLE 1

A conventional SAE type IV deicing composition is initially prepared by mixing the following components:
50.00% by weight of 1,2-propylene glycol
0.50% by weight of tolyltriazole
0.33% by weight of crosslinked polyacrylic acid
0.12% by weight of $C_{12/16}$ fatty alcohol ethoxylate with 6 mol of ethylene oxide
0.18% by weight of sodium hydroxide
48.87% by weight of water.

The components were dissolved by vigorous stirring and heating to 60° C. within 3 h. The resulting deicing composition was examined with regard to the viscosity and the shear stability:

| Viscosity (0.3 rpm, 20° C.) (viscosity at rest) | Viscosity (60 rpm, 20° C.) (flow viscosity) | Viscosity (0.3 rpm, 20° C.), (viscosity at rest) (after mechanical stress by means of the counter-rotating mixer) |
| --- | --- | --- |
| 25 000 mPas | 820 mPas | 20 100 mPas |

At a spindle rotation rate of 0.3 rpm, the deicing composition has a viscosity of 25 000 mPas. This value is within the range customary for SAE type IV deicing compositions. When the spindle rotation rate is increased to 60 rpm, the viscosity falls to 820 mPas. This rheological behavior which is referred to as pseudoplastic ensures that the deicing composition runs fully off the surfaces when aircraft take off. When this deicing composition is stressed using a Brookfield counter-rotating mixer (5 min/3500 rpm) and the viscosity of this sample is measured again after the 5 minutes have elapsed, the viscosity at rest is only 20 100 mPas. The deicing composition still just satisfies the prerequisite of an SAE type IV deicing composition with regard to the holdover time. A further mechanical stress could result in the viscosity of the deicing composition falling below the range permissible therefor and it could thus no longer be used to protect aircraft from reicing.

Subsequently, the gel performance of this aircraft deicing composition is examined. To this end, an aged aluminum sheet is immersed into the deicing composition for four seconds and subsequently dried at a temperature of 30° C. After 24 hours, this step is repeated in each case six times with the same sheet.

Subsequently, the sheet with the dried deicing composition residue is immersed into demineralized water for 30 seconds and pulled carefully back out of the water. After 60 seconds, the weight of the sheet with the swollen deicing composition residue is weighed. This rehydration step is repeated a total of ten times. Subsequently, the profile of the change in weight can be used to assess the gelling tendency of the deicing composition.

For the aircraft deicing composition described under Example 1, it is noticeable that the dry residue swelled very markedly with water and is subsequently removed again from the aluminum plate only with difficulty. If such an aircraft deicing composition were to accumulate in aerodynamically quiet zones of the aircraft wings after takeoff and subsequently dry, these residues might swell greatly if they were to come into contact with moisture such as rainwater. The resulting gel-like residues might freeze at low temperatures, as occur at high flying heights, and thus block the elevators, which would result in the aircraft no longer being fully maneuverable.

EXAMPLE 2

An inventive SAE type II deicing composition is now prepared by mixing the following components:
50.00% by weight of 1,2-propylene glycol
0.05% by weight of tolyltriazole
0.15% by weight of $C_{12}/C_{14}$ fatty alcohol ethoxylated with 5 mol of ethylene oxide
1.5% by weight of synthet. hectorite
$(Mg_{2.67}Li_{0.33})Si_4O_{10}(OH,F)_2)Na_{0.33}H_2O$
48.3% by weight of water.

The components were dissolved by vigorous stirring and heating to 60° C. within 3 h. The resulting deicing composition was examined with regard to the viscosity and the shear stability:

| Viscosity (0.3 rpm, 20° C.) (viscosity at rest) | Viscosity (60 rpm, 20° C.) (flow viscosity) | Viscosity (0.3 rpm, 20° C.), (viscosity at rest) (after mechanical stress by means of the counter-rotating mixer) |
| --- | --- | --- |
| 7600 mPas | 190 mPas | 7400 mPas |

At a spindle rotation rate of 0.3 rpm, the deicing composition has a viscosity of 7600 mPas. This value is within the range customary for SAE type II deicing compositions. When the spindle rotation rate is increased to 60 rpm, the viscosity falls to 190 mPas. This rheological behavior which is referred to as pseudoplastic ensures that the deicing composition runs fully off the surfaces when aircraft take off. When this deicing composition is stressed using a Brookfield counter-rotating mixer (5 min/3500 rpm) and the viscosity of this sample is measured again after the 5 minutes have elapsed, the viscosity at rest is again 7400 mPas. This proves that the deicing composition, on mechanical stress, as occurs in the course of high shear stress by high-speed stirrers, pumps, or in the course of flow through small pipe cross sections, cannot be irreversibly damaged.

Subsequently, the gel performance of this aircraft deicing composition is examined. To this end, an aged aluminum sheet is immersed into the deicing composition for four seconds and subsequently dried at a temperature of 30° C. After 24 hours, this step is repeated in each case six times with the same sheet.

Subsequently, the sheet with the dried deicing composition residue is immersed into demineralized water for 30 seconds and pulled carefully back out of the water. After 60 seconds, the weight of the sheet with the swollen deicing composition residue is weighed. This rehydration step is repeated a total of ten times. Subsequently, the profile of the change in weight can be used to assess the gelling tendency of the deicing composition.

For the deicing composition specified under Example 2, it is distinctly noticeable that the mass of the dry residue is substantially smaller than for the deicing composition described under Example 1. In addition, this residue can be completely removed after the fourth immersion operation with water. Dried residues of this aircraft deicing composition in aerodynamically quiet zones would not form any sparingly soluble gels with rainwater, but rather rapidly be flushed off.

Further examinations of the aircraft deicing composition described under Example 2 show that all further requirements of the SAE specification AMS 1428 are fulfilled. For instance, the icing protection time (WSET test) of this type II deicing composition is greater than 30 minutes. The 1:1 dilution with water exhibits a holdover time of more than 5 minutes. The runoff behavior in a wind tunnel of all concentrations to be tested corresponds to the minimum requirement at all temperatures required. In addition, all material tests are passed.

EXAMPLE 3

An inventive SAE type II deicing composition is prepared by mixing the following components:

60.00% by weight of diethylene glycol
0.05% by weight of benzotriazole
0.1% by weight of $C_{12}/C_{14}$ fatty alcohol ethoxylated with 4 mol of ethylene oxide
1.7% by weight of synthet. hectorite $(Mg_{2.67}Li_{0.33})Si_4O_{10}(OH,F)_2)Na_{0.33}H_2O$
38.15% by weight of water.

The components were dissolved by vigorous stirring and heating to 60° C. within 3 h. The resulting deicing composition was examined with regard to the viscosity and the shear stability:

| Viscosity (0.3 rpm, 20° C.) (viscosity at rest) | Viscosity (60 rpm, 20° C.) (flow viscosity) | Viscosity (0.3 rpm, 20° C.), (viscosity at rest) (after mechanical stress by means of the counter-rotating mixer) |
| --- | --- | --- |
| 6800 mPas | 160 mPas | 6400 mPas |

When the deicing composition is stressed using a Brookfield counter-rotating mixer (5 min/3500 rpm) and the viscosity of this sample is measured again after the 5 minutes have elapsed, the viscosity at rest is 6400 mPas. This proves that the deicing composition, on high shear stress, does not suffer any irreversible damage.

The examination of the gel behavior of this aircraft deicing composition has shown that the deicing composition residue can be rapidly flushed off using water.

Further examinations of the aircraft deicing composition described under Example 3 show that all further requirements of the SAE specification AMS 1428 are fulfilled. For instance, the icing protection time (WSET test) of this type II deicing composition is greater than 30 minutes. The 1:1 dilution with water exhibits a holdover time of more than 5 minutes. The runoff behavior in a wind tunnel of all concentrations to be tested corresponds to the minimum requirement at all temperatures required. In addition, all material tests are passed.

EXAMPLE 4

An inventive SAE type II deicing composition is prepared by mixing the following components:

50.00% by weight of 1,2-propylene glycol
0.05% by weight of tolyltriazole
0.75% by weight of sodium alkylbenzenesulfonate (sodium dodecylbenzenesulfonate)
1.35% by weight of synthet. hectorite $(Mg_{2.67}Li_{0.33})Si_4O_{10}(OH,F)_2)Na_{0.33}H_2O$
47.85% by weight of water.

The components were dissolved by vigorous stirring and heating to 60° C. within 3 h. The resulting deicing composition was examined with regard to the viscosity and the shear stability:

| Viscosity (0.3 rpm, 20° C.) (viscosity at rest) | Viscosity (60 rpm, 20° C.) (flow viscosity) | Viscosity (0.3 rpm, 20° C.), (viscosity at rest) (after mechanical stress by means of the counter-rotating mixer) |
| --- | --- | --- |
| 6000 mPas | 230 mPas | 5900 mPas |

When the deicing composition is stressed using a Brookfield counter-rotating mixer (5 min/3500 rpm) and the viscosity of this sample is measured again after the 5 minutes have elapsed, the viscosity at rest is 5900 mPas. This proves that the deicing composition, on high shear stress, does not suffer any irreversible damage.

The examination of the gel behavior of this aircraft deicing composition has shown that the deicing composition residue can be rapidly flushed off using water.

Further examinations of the aircraft deicing composition described under Example 4 show that all further requirements of the SAE specification AMS 1428 are fulfilled. For instance, the icing protection time (WSET test) of this type II deicing composition is greater than 30 minutes. The 1:1 dilution with water exhibits a holdover time of more than 5 minutes. The runoff behavior in a wind tunnel of all concentrations to be tested corresponds to the minimum requirement at all temperatures required. In addition, all material tests are passed.

EXAMPLE 5

An inventive SAE type IV deicing composition is prepared by mixing the following components:

50.00% by weight of 1,2-propylene glycol
0.05% by weight of tolyltriazole
0.2% by weight of $C_{12/16}$ fatty alcohol ethoxylated with 6 mol of ethylene oxide
2.25% by weight of synthet. hectorite $(Mg_{2.67}Li_{0.33})Si_4O_{10}(OH,F)_2)Na_{0.33}H_2O$
47.5% by weight of water.

The components were dissolved by vigorous stirring and heating to 60° C. within 3 h. The resulting deicing composition was examined with regard to the viscosity and the shear stability:

| Viscosity (0.3 rpm, 20° C.) (viscosity at rest) | Viscosity (60 rpm, 20° C.) (flow viscosity) | Viscosity (0.3 rpm, 20° C.), (viscosity at rest) (after mechanical stress by means of the counter-rotating mixer) |
| --- | --- | --- |
| 19 800 mPas | 450 mPas | 19 500 mPas |

When the deicing composition is stressed using a Brookfield counter-rotating mixer (5 min/3500 rpm) and the viscosity of this sample is measured again after the 5 minutes have elapsed, the viscosity at rest is 19 500 mPas. This proves that the deicing composition, on high shear stress, does not suffer any irreversible damage.

The examination of the gel behavior of this aircraft deicing composition has shown that the deicing composition residue can be rapidly flushed off using water.

Further examinations of the aircraft deicing composition described under Example 5 show that all further requirements of the SAE specification AMS 1428 are fulfilled. For instance, the icing protection time (WSET test) of this type IV deicing composition is greater than 80 minutes. The 1:1 dilution with water exhibits a holdover time of more than 5 minutes. The runoff behavior in a wind tunnel of all concentrations to be tested corresponds to the minimum requirement at all temperatures required. In addition, all material tests are passed.

EXAMPLE 6

An inventive SAE type IV deicing composition is prepared by mixing the following components:
50.00% by weight of 1,2-propylene glycol
0.05% by weight of benzotriazole
0.12% by weight of $C_{12/14}$ fatty alcohol ethoxylated with 2 mol of ethylene oxide
2.6% by weight of synthet. saponite $((Mg_3)Si_{3.7}A_{0.3})O_{10}(OH)_2)Na_{0.3}H_2O$
47.23% by weight of water.

The components were dissolved by vigorous stirring and heating to 60° C. within 3 h. The resulting deicing composition was examined with regard to the viscosity and the shear stability:

| Viscosity (0.3 rpm, 20° C.) (viscosity at rest) | Viscosity (60 rpm, 20° C.) (flow viscosity) | Viscosity (0.3 rpm, 20° C.), (viscosity at rest) (after mechanical stress by means of the counter-rotating mixer) |
|---|---|---|
| 12 600 mPas | 300 mPas | 12 000 mPas |

When the deicing composition is stressed using a Brookfield counter-rotating mixer (5 min/3500 rpm) and the viscosity of this sample is measured again after the 5 minutes have elapsed, the viscosity at rest is 12 000 mPas. This proves that the deicing composition, on high shear stress, does not suffer any irreversible damage.

The examination of the gel behavior of this aircraft deicing composition has shown that the deicing composition residue can be rapidly flushed off using water.

Further examinations of the aircraft deicing composition described under Example 6 show that all further requirements of the SAE specification AMS 1428 are fulfilled. For instance, the icing protection time (WSET test) of this type IV deicing composition is greater than 80 minutes. The 1:1 dilution with water exhibits a holdover time of more than 5 minutes. The runoff behavior in a wind tunnel of all concentrations to be tested corresponds to the minimum requirement at all temperatures required. In addition, all material tests are passed.

EXAMPLE 7

An inventive SAE type IV deicing composition is prepared by mixing the following components:
55.00% by weight of 1,2-propylene glycol
0.05% by weight of tolyltriazole
0.12% by weight of $C_{12/14}$ fatty alcohol ethoxylated with 6 mol of ethylene oxide
0.8% by weight of nat. saponite $((Mg_3)Si_{3.7}Al_{0.3})O_{10}(OH)_2)Na_{0.3}H_2O$
0.1% by weight of crosslinked sodium polyacrylate
43.93% by weight of water.

The components were dissolved by vigorous stirring and heating to 60° C. within 3 h. The resulting deicing composition was examined with regard to the viscosity and the shear stability:

| Viscosity (0.3 rpm, 20° C.) (viscosity at rest) | Viscosity (60 rpm, 20° C.) (flow viscosity) | Viscosity (0.3 rpm, 20° C.), (viscosity at rest) (after mechanical stress by means of the counter-rotating mixer) |
|---|---|---|
| 20 600 mPas | 120 mPas | 20 000 mPas |

When the deicing composition is stressed using a Brookfield counter-rotating mixer (5 min/3500 rpm) and the viscosity of this sample is measured again after the 5 minutes have elapsed, the viscosity at rest is 20 000 mPas. This proves that the deicing composition, on high shear stress, does not suffer any irreversible damage.

The examination of the gel behavior of this aircraft deicing composition has shown that the deicing composition residue can be rapidly flushed off using water.

Further examinations of the aircraft deicing composition described under Example 7 show that all further requirements of the SAE specification AMS 1428 are fulfilled. For instance, the icing protection time (WSET test) of this type IV deicing composition is greater than 80 minutes. The 1:1 dilution with water exhibits a holdover time of more than 5 minutes. The runoff behavior in a wind tunnel of all concentrations to be tested corresponds to the minimum requirement at all temperatures required. In addition, all material tests are passed.

What is claimed is:

1. A method for removing frozen precipitation from a surface of an aircraft and preventing reicing of the surface, said method comprising contacting said surface with a deicing composition having an icing protection time greater than 30 minutes, said deicing composition comprising from 35 to 93 by weight of at least one glycol and from 0.01 to 15% by weight of at least one water-soluble sheet silicate, and water to 100% by weight, based on the weight of the deicing composition, and removing said composition and said frozen precipitation from the surface after takeoff of the aircraft.

2. The method of claim 1, wherein the deicing composition consists of 0.05 to 10% by weight of water soluble sheet silicate; 45 to 90 by weight of at least one glycol; at least one component selected from the group consisting of a corrosion inhibitor, a nonionic or anionic surfactant, an organic thickener, and mixtures thereof, and water to 100%.

3. The method of claim 1, wherein the deicing composition, further comprises from 0.02 to 2% by weight of at least one corrosion inhibitor.

4. The method of claim 1, wherein the at least one glycol is selected from the group consisting of the alkylene glycols having from 2 to 3 carbon atoms, oxalkylene glycols having from 4 to 6 carbon atoms, and mixtures thereof.

5. The method of claim 1, wherein the deicing composition further comprises up to 10 percent by weight of at least one surfactant selected from the group consisting of a nonionic surfactant, an anionic surfactant, and mixtures thereof.

6. The method of claim 1, wherein the deicing composition further comprises from 0.1 to 5% by weight of an organic thickener selected from the group consisting of home or copolymers of unsaturated carboxylic acids, cellulose ethers, polyethylene glycol, polyvinylpyrrolidones, polyvinyl alcohols, polyethylene oxides, xanthan gum, and mixtures thereof.

7. The method of claim 1, wherein said water-soluble sheet silicate is selected from the group consisting of naturally occurring or synthetically obtained hectorite, bentonite, montmorillonite, and mixtures thereof.

8. The method of claim 1, wherein said water-soluble sheet silicate comprises compounds having a crystal structure of the formula $(A_{(2-y)}Mg_y)[Si_{(4-x)}Al_xO_{20}(OH)_2]_{(x+y)}^-$ where x and y are integers which bring about charge balance, or wherein Al is substituted by Mg or Fe, and mixtures thereof, or wherein Si is substituted by Al, and said crystal structure further comprising cations selected from the group consisting of K, Li, Ca, Mg, and mixtures thereof or said crystal structure further comprising anions selected from the group consisting of F, OH, and mixtures thereof.

9. The method of claim 1, wherein said water-soluble sheet silicate comprises a crystal structure of the formula $[Si_8(Mg_aLi_bH_c)O_{20}(OH)_{(4-y)}F_y]_2^-$ where a, b, c, y and z are integers which bring about charge balance, and wherein Ma is substituted by Al or Fe, or mixtures thereof, or wherein Si is substituted by Al, and said crystal structure further comprising cations selected from the group consisting of K, Li, Ca, Mg, and mixtures thereof, or said crystal structure further comprising anions selected from the group consisting of F, OH and mixtures thereof.

10. The method of claim 1, wherein the surface comprises aluminum plate.

* * * * *